Aug. 26, 1941.  L. K. HEDDING ET AL  2,253,705
ELECTRICAL REGULATING APPARATUS
Filed Jan. 17, 1940

INVENTORS
Linnie K. Hedding and
Paul S. Johnson.
BY
THEIR ATTORNEY

Patented Aug. 26, 1941

2,253,705

UNITED STATES PATENT OFFICE 2,253,705

ELECTRICAL REGULATING APPARATUS

Linnie K. Hedding, Swissvale, and Paul S. Johnson, Edgewood, Pa., assignors to The Union Switch & Signal Company, Swissvale, Pa., a corporation of Pennsylvania Application January 17, 1940, Serial No. 314,234

22 Claims. (Cl. 175—363)

Our invention relates to electrical regulating apparatus, and has particular reference to regulating apparatus of the class employed to control the output of rectifiers.

It is well known that the output terminal voltages of rectifiers, particularly rectifiers of the dry contact type exemplified by the copper oxide rectifier, are affected by two factors, one being the variation of voltage of the alternating current source and the other being the voltage drop in the rectifier due to the current drawn by the load. Ordinarily, the output terminal voltage of a rectifier increases as the applied voltage is increased and decreases as the load current is increased.

An object of our invention is the provision of novel and improved apparatus for regulating the output voltage of rectifiers in such a manner as to maintain a substantially constant output voltage over a desired range of variation in load current and applied voltage.

Another object of our invention is the provision of novel and improved regulating apparatus of the class described and incorporating novel and improved means for compensating for the voltage drop in the rectifier under varying load conditions.

The above-mentioned and other important objects of our invention which will become readily apparent from the following description we achieve by connecting a rectifier to its alternating current source through an alternating current winding disposed on a magnetizable core structure provided with means for varying the saturation of such core. An electromagnetic device having a load winding inductively coupled with a shunt winding also is employed, with the load winding interposed in the connection of the rectifier and source and the shunt winding connected in series with a condenser across the alternating current winding, the load winding of the device acting to control the condenser current and the effective voltage applied to the rectifier by varying the impedance of its associated shunt winding when the load current varies.

We shall describe several forms of apparatus embodying our invention, and shall then point out the novel features thereof in claims.

Figure 1:
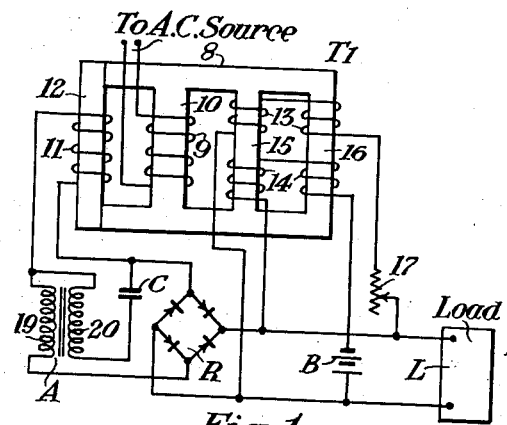

In the accompanying drawing, Fig. 1 is a diagrammatic view illustrating one form of electrical regulating apparatus embodying our invention. Figs. 2 to 6, inclusive, are diagrammatic views showing modified forms of the apparatus of Fig. 1, each also embodying our invention.

Similar reference characters refer to similar parts in each of the several views.

Referring first to Fig. 1, the reference character R designates a full wave rectifier which supplies energy to a variable direct current load L from a source of alternating current represented in the drawing by an alternating current supply line. Interposed between the source of alternating current and rectifier R is a transformer T1, which comprises a four-legged magnetizable core 8 carrying a primary winding 9 disposed on one leg 10 of the core. Winding 9 is constantly connected with the source of alternating current and is inductively coupled with a secondary winding 11, which winding is disposed on another leg 12 of core 8 and is connected across the input terminals of rectifier R. Leg 12 of transformer T1 preferably is separable from the core to provide a manually adjustable air gap for varying the inductive coupling of the primary and secondary windings of the transformer. Transformer T1 further comprises two control windings 13 and 14, each of which comprises two coils connected in series and disposed one on each of the two remaining legs 15 and 16 of transformer core 8. One control winding 13 is connected, together with an adjustable resistor 17, directly across the output terminals of rectifier R in shunt with the load L, and the other control winding 14 is connected, in series with a battery B, across the output terminals of rectifier R in shunt with the load. The two coils of each control winding are arranged on legs 15 and 16 in such manner that when supplied with unidirectional current from the rectifier and battery, the coils cooperate in circulating a unidirectional flux through a local magnetic circuit comprising legs 15 and 16 and the adjoining top and bottom portions of core 8. The arrangement of the coils of windings 13 and 14 also is such that the resultant of the electromotive forces induced in each winding in response to alternating current flux threading legs 15 and 16 in multiple is substantially zero.

The reference character A designates an electromagnetic device comprising a magnetizable core carrying a series winding 19 and a shunt winding 20 preferably tightly coupled therewith. The winding 19 of device A is interposed in the circuit connection of secondary winding 11 of transformer T1 with rectifier R and is, therefore, energized in accordance with the current drawn by the load. Shunt winding 20 of device A is connected in series with a condenser C, across the secondary winding 11 of transformer T1.

Normally, the parts of the apparatus just set forth are designed and proportioned in such manner that substantially the entire current drawn by the load L is supplied from rectifier R so that little if any current is supplied from battery B. In this condition of the apparatus, the output voltage of rectifier R substantially equals the terminal voltage of battery B with the result that current is neither supplied to nor drawn from the battery and consequently control winding 14 of transformer T1 is substantially deenergized. This is the condition which will obtain in the case of battery B being of the primary type. If a storage battery is used, the same operation will take place except that the apparatus will normally provide a small charging current for the battery. The other control winding 13 of transformer T1 is energized and sets up a biasing or saturating flux in the legs 15 and 16 of transformer core 8, which flux determines what portion of the transformer flux created by primary winding 9 will thread leg 12 upon which is mounted secondary winding 11. Thus, the inductive coupling between primary winding 9 and secondary winding 11 of transformer T1 and the inductance of secondary winding 11 are automatically controlled in part by means of the saturating flux set up by control winding 13.

In the event that the voltage of the alternating current source varies, within given limits, of course, the apparatus will function to maintain the output voltage of rectifier R substantially constant. If, for example, the voltage of the alternating current source increases so that an increased electromotive force is induced in secondary winding 11 and is applied to rectifier R, the increased output voltage of the rectifier will cause current to flow from the rectifier into battery B through control winding 14 of transformer T1. The direction of this current in winding 14 is such as to oppose the saturating effect of the current in transformer control winding 13, with the result that more primary flux is permitted to thread legs 15 and 16 of transformer core 8 to thereby decrease the inductive coupling of the transformer primary and secondary windings and also to increase the inductance of secondary winding 11 until the output voltage of rectifier R substantially equals the terminal voltage of battery B. In like manner, a decrease in the voltage of the alternating current source, resulting in a decreased output voltage of rectifier R, will permit current to flow from battery B through control winding 14 to the load. The direction of this current in winding 14 is now such as to aid the saturating effect of control winding 13, with the result that less primary flux is permitted to thread legs 15 and 16 to thereby increase the inductive coupling of the transformer primary and secondary windings and to decrease the inductance of winding 11 until the rectifier output voltage again substantially equals the terminal voltage of battery B. It follows that by properly proportioning the various parts of the regulating apparatus, the output voltage of rectifier R is maintained substantially constant over a relatively wide range of variations in voltage of the alternating current source by controlling the saturation of core 8. It will be apparent that for certain applications it may be desirable to obtain a decrease in inductance of winding 11 with an increase in applied voltage and this can be done by operating the core 12 at a flux density below that which provides maximum permeability.

In the event that the voltage drop in rectifier R varies due to variations in load resistance, then transformer T1, device A and condenser C cooperate to compensate for such voltage drop variations to maintain the output voltage of the rectifier substantially constant. To do this, the capacity of condenser C and the impedance of winding 20 are so proportioned with respect to the inductance of secondary winding 11 that the circuit formed thereby is not in effective resonance when the rectifier draws little current, as under low load conditions, with the result that comparatively little current flows through condenser C at low loads. In other words, even though the circuit may be near resonance normally, the load resistance is very high at low loads, so that the resonant effect is largely suppressed. As the load current increases, the impedance of winding 20 is varied due to the increased current flow in winding 19 so that the circuit including windings 11 and 20 and condenser C approaches effective resonance with the result that the condenser current increases. The increased current drawn by condenser C results in a larger voltage effective across winding 11. The resultant voltage applied to the input terminals of rectifier R is correspondingly increased due to the action of device A and condenser C. Thus, the increase in voltage effects compensation for the larger voltage drop in the rectifier caused by the larger load current. It follows that by properly proportioning the parts of device A and condenser C, a substantially constant output voltage can be maintained for the rectifier over a wide range of load current.

It should be pointed out that if desired the parts can be so proportioned that the full resonance point will be reached at any suitable value of load current, which need not necessarily be the full load value. It should also be noted that the change in inductance of winding 11 caused by variations in the saturating flux supplied to transformer T1 will add its effect in bringing the above-mentioned circuit into or out of resonance, thereby enabling very close regulation of the rectifier output to be maintained.

Figure 2:
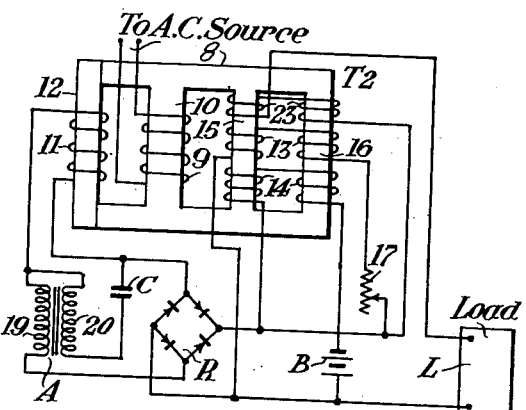

Referring now to Fig. 2, a modification of the apparatus of Fig. 1 is shown wherein a transformer T2 similar to transformer T1 is provided with a load current control winding 23, which comprises two coils connected in series and disposed one on each leg 15 and 16 of transformer core 8. Winding 23 is interposed between rectifier R and the load and is, therefore, energized in accordance with the magnitude of the current supplied to the load. The coils of winding 23 are wound on legs 15 and 16 of transformer core 8 in such direction that winding 23 when energized sets up a flux which aids the flux set up by control winding 13.

It is believed that the operation of the apparatus of Fig. 2 will readily be apparent from the foregoing description of the operation of the apparatus of Fig. 1 together with an inspection of Fig. 2 so that further detailed explanation is deemed unnecessary except to point out that as the load current increases through control winding 23, more saturating flux is supplied to legs 15 and 16 of transformer core 8. As a result of the increased saturating flux supplied to transformer T2, a greater proportion of the primary flux is forced through leg 12, thereby increasing the electromotive force induced in winding 11 and also varying the inductance of this winding, thus tending to maintain constant the terminal voltage of rectifier R.

Figure 3:
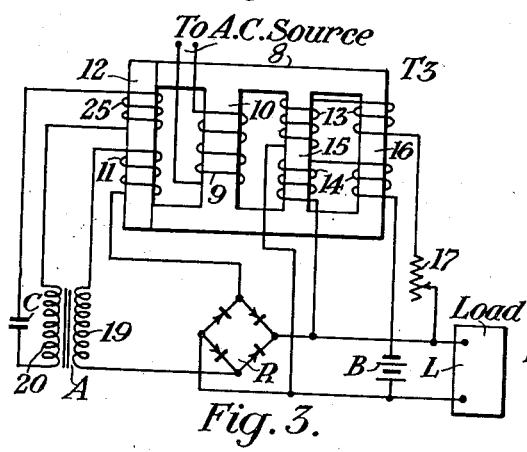

Fig. 3 discloses a further modification of Fig. 1, in which a transformer T3 similar to transformer T1 is provided with a separate secondary winding 25 which is connected in circuit with shunt winding 20 of device A and condenser C. The impedance of shunt winding 20 of device A is controlled by the current drawn by rectifier R through load winding 19 in such manner as to bring winding 25 and condenser C into effective resonance as full load is approached, with the result that an increase in voltage is effective across winding 25 and hence across winding 11. Accordingly, the voltage applied across the input terminals of rectifier R is increased and compensates for the increased voltage drop in the rectifier as the current drawn by the load increases.

An advantage of the apparatus of Fig. 3 is that by virtue of the separate secondary winding 25 of transformer T3, a higher voltage can be impressed across condenser C so that a condenser of lower capacity may be employed to obtain the advantages of the apparatus of Figs. 1 and 2, thereby effecting a reduction in the size and cost of the apparatus.

Figure 4:
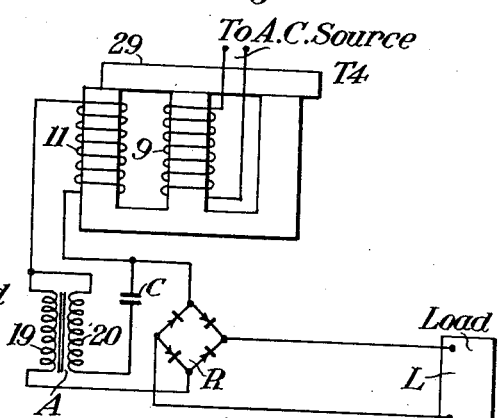

Another modification of the apparatus of Fig. 1 is shown in Fig. 4 wherein a three-legged transformer T4 provided with an adjustable yoke 29 is employed in conjunction with device A and condenser C to regulate the output voltage of rectifier R. Compensation and adjustment of the output voltage of rectifier R of Fig. 4 for varying applied voltages is effected through the medium of adjustable block 29 of transformer T4, the yoke functioning to control the saturation and reluctance of the transformer core in accordance with its position on the core. Compensation of the rectifier for variations in load current is effected by means of the device A and condenser C, as before.

It is believed that the operation of the apparatus of Fig. 4 will readily be apparent from an inspection of Fig. 4 taken with the foregoing description of the operation of the apparatus of Fig. 1, and further detailed explanation is deemed unnecessary except to point out that no stand-by source of power is employed with the apparatus of Fig. 4, hence this apparatus is particularly useful in connection with a constant potential source of alternating current. It also should be pointed out that the circuit constants of device A and condenser C may be so selected as to maintain constant the output voltage of rectifier R as the load current varies, or may, if desired, be so selected as to increase the output voltage of rectifier R as the load current increases.

Figure 5:
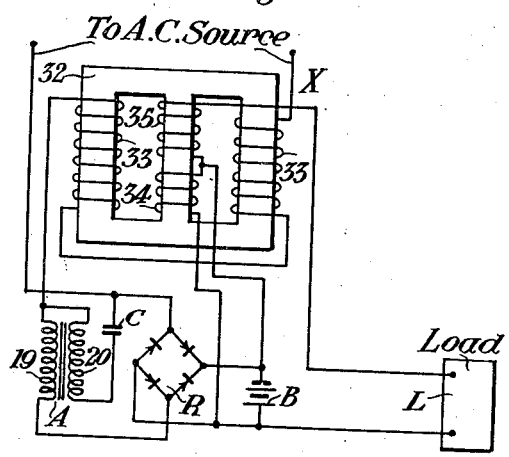
Figure 6:
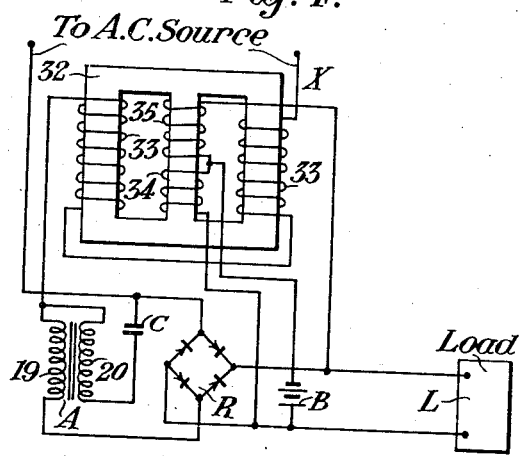

Figs. 5 and 6 each disclose a further modification of the apparatus of Fig. 1. In Fig. 5 a saturable reactor X is interposed between the alternating current source and rectifier R to provide compensation for fluctuations in load current and applied voltage. As shown, reactor X comprises a three-legged magnetizable core 32 carrying an alternating current winding 33 disposed on each outer leg of the core. The reactance of winding 33 is controlled by means of two control windings 34 and 35 disposed on the middle leg of reactor core 32, one winding 34 being connected directly across rectifier R in shunt with the load, and the other winding 35 being interposed between rectifier R and the load. The two windings 34 and 35 are disposed on core 32 in such manner that when energized the windings create opposing fluxes, the resultant of which is effective to vary the reactance of alternating current winding 33.

The apparatus of Fig. 5 is proportioned and designed in such manner that substantially the entire load is supplied from rectifier R, and substantially no current is drawn from or supplied to battery B, it being understood that if a battery of the secondary type is used, a small charging current will normally be supplied to the battery. The output terminal voltage of rectifier R, therefore, will substantially equal the terminal voltage of battery B. This is accomplished by the apparatus in that the resultant flux set up in reactor core 32 by control windings 34 and 35 controls the reactance of winding 33 to a value such that the current supplied to rectifier R through load winding 19 of device A causes the output voltage of rectifier R to equal the terminal voltage of battery B.

If, however, the load resistance decreases so that more current is drawn, the terminal voltage of rectifier R tends to drop and battery B tends to supply current. The increased current through control winding 35 increases the resultant flux set up by coils 34 and 35 (the flux of coil 34 remaining constant by virtue of the potential of battery B applied thereto) to decrease the reactance of winding 33. As a result of the decreased reactance, a correspondingly higher voltage is supplied to rectifier R. Also, due to the increased current through load winding 19 of device A, more current is supplied to condenser C. The impedances of alternating current winding 33 of reactor X and shunt winding 20 of device A continue to be reduced as the load increases, with the effect that winding 33 and condenser C approach effective resonance. As was pointed out hereinbefore, an increase in current flow through condenser C results in an increased voltage supplied to the rectifier, whereby by proper proportioning of the parts of the apparatus, the output terminal voltage of the rectifier is maintained constant over the desired range of load variation.

It should be pointed out that if the apparatus of Fig. 5 is modified to dispense with battery B, partial compensation for fluctuations of the applied voltage is effected under this condition since the current flowing in winding 34 will vary in accordance with the output voltage of rectifier R. Due to this variation of the current in winding 34, the resultant flux set up in core 32 will vary to cause corresponding variations in the reactance of winding 33 and as a result the voltage applied to rectifier R will be decreased or increased according as the output voltage of the rectifier increases or decreases.

In Fig. 6, the apparatus shown in Fig. 5 is modified to interpose winding 35 of reactor X between the rectifier R and battery B. This winding is so wound that its flux aids the flux established by winding 34. The apparatus of Fig. 6 preferably is proportioned in such manner that normally the entire load is supplied from the rectifier so that current is neither supplied to nor drawn from the battery, and as a result winding 35 normally is deenergized and only winding 34 supplies flux to the core 32 of the reactor. However, if the output voltage of the rectifier varies so that current flows either from the rectifier to the battery or from the battery to the load through winding 35, the flux due to such current modifies the control established over winding 33 by subtracting from or adding to the saturating effect of winding 34 in accordance with the current direction. It is readily apparent that winding 35 reflects any deviation of the rectifier voltage from the battery voltage and accordingly winding 35 modifies the control established by winding 34 to vary not only the input voltage of rectifier R directly because of variations in the reactance of winding 33 but also to aid in bringing the circuit comprising winding 33 and condenser C into or out of effective resonance, thereby assisting in the control established over the voltage of rectifier R by the current in winding 19 of device A. It follows that since winding 35 is extremely sensitive to variations in the rectifier output voltage and since such voltage is variable due to fluctuations of either or both the load current and the voltage of the alternating current source, very close regulation for both load current and supply voltage variations is effected by the apparatus of Fig. 6.

It will be obvious that in each of Figs. 5 and 6 the two reactance windings 33 can be connected in multiple with each other, if preferred, rather than in series, as shown. The number of turns would, of course, be altered in such case, to provide the desired impedance.

Although we have herein shown and described only a few forms of electrical regulating apparatus embodying our invention, it is understood that various changes and modifications may be made therein within the scope of the appended claims without departing from the spirit and scope of our invention.

Having thus described our invention, what we claim is:

1. In combination, a source of alternating current, a load circuit including a direct current load and a battery connected in shunt, a rectifier interposed between said source and said load circuit, means interposed between said source and said rectifier and controlled by the difference in potential between said rectifier and said battery for maintaining the rectifier output voltage substantially constant over a given range of variation in voltage of said source, a condenser, means for supplying energy from said source to said condenser, and means for varying the condenser current in accordance with the current drawn by said rectifier, said last-mentioned means connected across the input terminals of the rectifier and effective in response to the magnitude of said condenser current to vary the voltage applied to said rectifier, thereby compensating for the voltage drop in the rectifier due to the current drawn by said load.

2. In combination, a source of alternating current, a load circuit including a direct current load and a battery connected in shunt, a rectifier interposed between said source and said load circuit, a saturable core device interposed between said source and said rectifier and controlled by the difference in potential between said rectifier and said battery for maintaining the rectifier output voltage substantially constant over a given range of variation in voltage of said source, a condenser and an inductance both connected across the input terminals of said rectifier, said condenser being coupled with a winding of said inductance, and means for automatically varying said inductance as the load current varies to thereby vary the condenser current in accordance with the current drawn by said rectifier, said condenser current operating on said saturable core device to vary the voltage applied to said rectifier in accordance with load current conditions to thereby maintain the output voltage of said rectifier substantially constant over a predetermined range of load current.

3. In combination, a source of alternating current, a load circuit including a direct current load and a battery connected in shunt, a rectifier interposed between said source and said load circuit, means including a saturable core device interposed between said source and said rectifier and having an output winding the voltage of which responds to the difference in potential between said rectifier and said battery to thereby maintain the rectifier output voltage substantially constant over a given range of variation in voltage of said source, a condenser, and an electromagnetic device having two inductively coupled windings one of which is interposed between said output winding and said rectifier and the other of which is connected across said output winding through said condenser, whereby the current in said condenser is varied in accordance with the load current drawn through said rectifier to cause the voltage applied to the rectifier to vary in such manner as to maintain the output voltage of the rectifier substantially constant when said load current varies.

4. In combination, a transformer having its primary winding connected to a source of alternating current, a rectifier receiving energy from the secondary winding of said transformer, a direct current load and a battery connected in shunt across said rectifier, means controlled by the difference in potential between said rectifier and said battery for varying the inductive coupling between said primary and secondary windings for maintaining the output voltage of said rectifier substantially constant over a given range of voltage variation in said alternating current source, an electromagnetic device having a load winding interposed between said rectifier and the secondary winding of said transformer, a shunt winding of said electromagnetic device inductively coupled with said load winding, and a condenser connected in series with said shunt winding across the secondary winding of said transformer.

5. In combination, a transformer having its primary winding connected to a source of alternating current, a rectifier receiving energy from the secondary winding of said transformer, a direct current load and a battery connected in shunt across said rectifier, means controlled by the difference in potential between said rectifier and said battery for varying the inductive coupling between said primary and secondary windings for maintaining the output voltage of said rectifier substantially constant over a given range of voltage variation in said alternating current source, other means responsive to the load current for varying the inductive coupling between said primary and secondary windings to thereby vary the voltage supplied from said secondary winding to the rectifier in accordance with the load current, a condenser, an inductance connected between said secondary winding and said rectifier, and a winding inductively coupled with said inductance and connected in series with said condenser across said secondary winding, whereby an increase of current in said inductance due to increased load current will cause an increased voltage input to said rectifier, thereby assisting said other means in compensating for load current changes.

6. In combination, a transformer having its input winding connected to a source of alternating current, a rectifier receiving energy from the output winding of said transformer, a direct current load receiving energy from said rectifier, means controlled by the load current for varying the inductive coupling between said input and output windings to thereby vary the voltage of said output winding so as to compensate for changes in said load current, a condenser, and a second transformer having one winding connected between said output winding and said rectifier and having another winding connected across said output winding in series with said condenser, the parts being so proportioned that an increase of current in said one winding due to an increase in said load causes an increase of voltage supplied to said rectifier, thereby assisting said means to compensate for changes in said load current.

7. In combination, a transformer having its input winding connected to a source of alternating current, a rectifier receiving energy from the output winding of said transformer, a direct current load receiving energy from said rectifier, means controlled by the load current for varying the inductance of said output winding, a condenser, and a second transformer having one winding connected between said output winding and said rectifier and having another winding connected across said output winding in series with said condenser, the parts being so proportioned that an increase of current in said one winding due to an increase in said load causes an increase of voltage supplied to said rectifier to compensate for load changes, the parts being further so proportioned that said change in inductance of said output winding is effective in the circuit of said other winding to assist said increase in voltage applied to said rectifier as the load current increases.

8. In combination, a transformer having its primary winding connected to a source of alternating current, a rectifier receiving energy from one secondary winding of said transformer, a direct current load and a battery connected in shunt across said rectifier, means controlled by the difference in potential between said rectifier and said battery for varying the inductive coupling between said primary winding and said one secondary winding for maintaining the output voltage of said rectifier substantially constant over a given range of voltage variation of said source, a condenser and an inductance connected across another secondary winding of said transformer, and a winding interposed between said one secondary winding and said rectifier and inductively coupled with said inductance, whereby an increase in load current causes an increase in voltage supplied to said rectifier to thereby compensate for changes in said load current.

9. In combination, a transformer having its input winding connected to a source of alternating current, a rectifier receiving energy from one output winding of said transformer, a direct current load connected across said rectifier, a condenser and an inductance connected across another output winding of said transformer, and a winding interposed between said one output winding and said rectifier and inductively coupled with said inductance, whereby an increase in load current causes an increase in voltage supplied to said rectifier to thereby compensate for changes in said load current.

10. The combination with a source of alternating current, a rectifier and a direct current load supplied with energy from said rectifier; of a transformer having its primary winding connected to said source and having its secondary winding connected to supply energy to said rectifier, a condenser and an inductance connected across said secondary winding in shunt with said rectifier, and a load winding interposed between said secondary winding and said rectifier and inductively coupled with said inductance, the parts being so proportioned that an increase of current in said load winding due to an increase in said load causes an increase in the voltage supplied to said rectifier to thereby compensate for changes in said load current.

11. In combination, a source of alternating current, a load circuit including a direct current load and a battery connected in shunt, a rectifier interposed between said source and said load circuit, a variable inductance interposed between said source and said rectifier, means controlled by the difference in potential between said rectifier and said battery for varying said inductance to maintain the rectifier output voltage substantially constant over a given range of voltage variation of said source, a condenser, a first winding connected across said variable inductance in series with said condenser, and a second winding interposed between said variable inductance and said rectifier and inductively coupled with said first winding, whereby an increase in the load current causes an increase in the voltage applied to said rectifier, thereby compensating for variations in said load current.

12. In combination, a source of alternating current, a load circuit including a direct current load and a battery connected in shunt, a rectifier interposed between said source and said load circuit, a variable inductance interposed between said source and said rectifier, means responsive to the load current for controlling the impedance of said variable inductance in accordance with variations in said load current to thereby vary the voltage supplied to said rectifier, a first winding and a condenser connected across said source in shunt with said rectifier, and a second winding interposed between said source and said rectifier and inductively coupled with said first winding, whereby an increase of current in said second winding due to an increase in load current causes an increase of voltage supplied to said rectifier, thereby assisting said means to compensate for changes in said load current.

13. In combination with an alternating current source, a direct current load energized from said source, an inductance, a rectifier interposed between said source and said load for energizing said load over said inductance, means responsive to the load current supplied by said rectifier for varying said inductance, an electromagnetic device having one of its two inductively coupled windings interposed between said source and said rectifier in series with said inductance, and a condenser connected in series with the other of said two windings, said condenser and said other winding being together connected across said inductance.

14. In combination, an alternating current source, an inductance, a rectifier connected to receive energy from said source through said inductance and in turn supplying energy to a direct current load, a first winding interposed between said source and said rectifier in series with said inductance so as to be traversed by the current supplied to said load, a condenser, and a second winding inductively coupled with said first winding and connected in series with said condenser, said second winding and said condenser being together connected across said inductance.

15. In combination, an alternating current source, an inductance, a load circuit including a direct current load and a battery connected in shunt, a rectifier interposed between said source and said load circuit for energizing said load over said inductance, means responsive to a difference in potential between said rectifier and said battery for varying said inductance to thereby vary the voltage supplied to said rectifier and so to compensate for changes in voltage of said source, an electromagnetic device having one of its two inductively coupled windings interposed between said source and said rectifier in series with said inductance, and a condenser connected in series with the other of said two windings across said inductance, whereby an increase of current in said one winding due to an increase in load causes an increase of voltage supplied to said rectifier, thereby compensating for changes in said load current.

16. In combination with a transformer having its primary winding connected to a source of alternating current, a rectifier connected across the secondary winding of said transformer for supplying current to a load circuit, a saturation winding carried by said transformer for varying the inductance of said secondary winding in accordance with variations in the load current supplied by said rectifier, a condenser and a control winding series-connected across said secondary winding, and a load winding interposed between said secondary winding and said rectifier and inductively coupled with said control winding.

17. In combination, a source of alternating current, a load circuit including a direct current load and a battery connected in shunt, a rectifier interposed between said source and said load circuit, a variable reactor having alternating current windings interposed in circuit with said source and said rectifier, said reactor having direct current windings responsive to potential differentials between said rectifier and said battery for varying the inductance of said alternating current windings to compensate for changes in voltage of said source, a condenser and a control winding connected across said source in series with said alternating current windings, and a load winding connected between said alternating current windings and said rectifier and inductively coupled with said control winding, whereby an increase of current in said load winding due to an increase in said load causes an increase in voltage supplied to said rectifier, to thereby compensate for changes in said load current.

18. In combination with a direct current load and an alternating current source, a rectifier interposed between said source and said load, a variable reactor having an alternating current winding interposed in circuit with said source and said rectifier, said reactor having a direct current winding interposed between said rectifier and said load for varying the inductance of said alternating current winding in accordance with the output of said rectifier, a condenser and a control winding connected across said source in series with said alternating current winding, and means for varying the impedance of said control winding in accordance with the current drawn by said load thereby assisting said alternating current winding in compensating for changes in the current drawn by said load.

19. In combination, a source of alternating current, a rectifier energized from said source for supplying energy to a direct current load, a transformer interposed between said source and said rectifier and having an input and an output winding as well as an adjustable core member for varying the inductive coupling between said transformer windings, a condenser and a control winding series-connected across said output winding, and means for varying the impedance of said control winding in accordance with the current drawn by said load in such manner as to cause the voltage delivered by said output winding to the rectifier to increase with an increase in load current, thereby compensating for changes in said load current.

20. In combination with a source of alternating current and a direct current load, a transformer having relatively high leakage reactance and having its input winding energized from said source, a rectifier, an output winding for said transformer supplying current to said load through said rectifier, a load winding connected between said output winding and said rectifier, a condenser, and a control winding connected in series with said condenser across said output winding and inductively coupled with said load winding.

21. In combination with a source of alternating current and a direct current load, a transformer having relatively high leakage reactance and having its input winding energized from said source, a rectifier, an output winding for said transformer supplying current to said load through said rectifier, a condenser, an inductance connected in series with said condenser across said output winding, and means responsive to the magnitude of the load current for varying the impedance of said inductance to thereby vary the condition of resonance between said output winding and said condenser so as to vary the voltage applied to said rectifier in accordance with variations in said load current.

22. In combination with a source of alternating current and a direct current load, a rectifier through which said load is energized, a saturable core device having a reactance winding interposed between said source and said rectifier, means controlled in accordance with the output of said rectifier for varying the saturation of said core to thereby vary the effectiveness of said reactance winding in controlling the voltage applied to said rectifier, an inductance and a condenser connected in a series circuit which includes said reactance winding, and means responsive to the magnitude of the load current for varying the impedance of said inductance to thereby vary the condition of resonance between said reactance winding and said condenser so as additionally to control the voltage applied to said rectifier and thereby compensate for variations in said load current.

LINNIE K. HEDDING.
PAUL S. JOHNSON.